United States Patent [19]

Spangler, Jr.

[11] 4,277,268
[45] Jul. 7, 1981

[54] HEAT PUMP FRACTIONATION PROCESS

[75] Inventor: Carl D. Spangler, Jr., Ponca City, Okla.

[73] Assignee: Conoco, Inc., Ponca City, Okla.

[21] Appl. No.: 85,825

[22] Filed: Oct. 17, 1979

[51] Int. Cl.³ .............................................. B01D 3/14
[52] U.S. Cl. ............................................ 62/26; 62/30; 203/24; 203/26; 208/350
[58] Field of Search .................... 203/24, 26, 78, 82, 203/85; 62/26, 30, 38, 39; 208/351, 355, 354, 358, 364

[56] References Cited

U.S. PATENT DOCUMENTS

| | | | |
|---|---|---|---|
| 2,277,387 | 3/1942 | Carney | 208/351 |
| 2,327,643 | 8/1943 | Houghland | 203/26 |
| 3,606,761 | 9/1971 | Muenger et al. | 62/38 |
| 3,783,126 | 1/1974 | Hayward et al. | 208/351 |
| 4,137,129 | 1/1979 | Bjorklund | 203/26 |

OTHER PUBLICATIONS

Oil & Gas Jrnl; 01 Sep. 75 Edition; pp. 85–88.

*Primary Examiner*—Frank Sever
*Attorney, Agent, or Firm*—Richard W. Collins

[57] ABSTRACT

A process for fractionating two or more compounds in which the stripping section of the fractionator is maintained at a first pressure and the rectifying section of the fractionator is maintained at a higher pressure. Overhead vapors from the stripping section are compressed in a heat pump where the vapor temperature and pressure are raised, and the heated and compressed vapors are then fed to the bottom of the rectifying section. Overhead vapors from the rectifying section, at a higher temperature than the bottoms from the stripping section, are heat exchanged with stripping section bottoms to condense overhead vapors and to supply reboiling heat to the stripping section.

4 Claims, 1 Drawing Figure

HEAT PUMP FRACTIONATION PROCESS

BACKGROUND OF THE INVENTION

This invention relates to fractionation processes in which two or more compounds are separated.

The separation of compounds by fractionation is an old and well-developed art. Fractionation is one of the most widely used processes in petroleum refining and chemical processing. Separation of chemical compounds is frequently carried out in a fractionating tower containing a stripping section and a rectifying section located below and above the feed point, respectively. These two sections commonly operate at the same pressure. Heat is normally applied at the bottom of the stripping section to reboil the bottoms liquid and heat is removed at the top of the rectifying section. The separation occurs in the fractionation column due to volatility differences between the compounds. The light components vaporize and the heavier or higher-boiling compounds condense so that the lighter components go overhead as a vapor and the heavier components go out the bottom as liquid. A condenser is normally used to condense at least a portion of the rectifying section overhead product so it can be returned to the top as reflux. The condensed reflux liquid passes down through the tower with heat and mass transfer occurring. Typically, a large portion of the heat removed from the overhead vapors is wasted in a condenser where it is heat exchanged with air or cooling water. This happens because the overhead vapors are normally at a low temperature level not suitable for generation of steam or other use. Also, all the heat input to the reboiler is normally from an external source. As a result of these factors, most fractionating towers are somewhat thermally inefficient.

It is known in the art that in certain situations compressors, which are often referred to as heat pumps in this context, may be used to advantage to reduce the utility cost of operating a fractionation process. This recognition has led to the utilization of a compressor (heat pump) to reboil the stripping section of a fractionation column by heat exchange of bottoms liquid and compressed overhead vapors of the same column. The prior art method of utilizing a heat pump in a fractionation process is described in an article starting at page 85 of the Sept. 1, 1975 edition of the *Oil & Gas Journal*. In this prior art system, the overhead vapor is compressed to raise its pressure and temperature and is then passed to the reboiler located at the bottom of the column. The heat exchange in the reboiler causes the condensation of some of the overhead vapor to produce a product liquid. Part of this condensed liquid is used as reflux. The heat given off in the condensation of the overhead vapors is transferred to the bottoms liquid from the stripping section to provide reboil heat.

A variation of the heat pump fractionation process described in the above-mentioned *Oil & Gas Journal* article is described in U.S. Pat. No. 4,137,129. The prior art fractionation processes utilizing heat pumps all use a single distillation column operated at a common pressure in both the stripping and rectifying sections.

In many fractionation processes, there are advantages in conducting the stripping portion of the fractionation at a low temperature and pressure. The tendency of the bottom materials to polymerize is reduced at lower temperatures, thus reducing fouling in the lower section of the distillation column. Also, the stripping operation is more efficient at lower pressures.

Similarly, there are advantages in operating the rectifying section at higher pressure, as this enables condensation of overhead vapors at more readily available temperatures, and the rectification process is more efficient at higher pressures.

A fractionating process utilizing a dual pressure fractionation tower is described in U.S. Pat. No. 3,783,126. The process described in that patent obtains the advantages of low temperature stripping operation and high pressure rectifying operation, but involves condensing overhead vapors from the top of the stripping section and pumping them at higher pressure into the rectifying section. Also, this process does not utilize heat from the rectifying section overhead vapors to reboil the bottoms in the stripping section.

A process for separating hydrocarbons in which a compressor is utilized between a stripping section and a rectifying section is described in U.S. Pat. No. 2,277,387. The process described in that patent does not utilize heat from rectifying section vapors to reboil the stripper.

Thus, there has been a need in the fractionation art for a process which combines the advantages of operating the stripping section of a distillation column at a low pressure and temperature while operating the rectifying section of the distillation column at a higher pressure, and simultaneously obtaining the efficiencies available from utilization of a heat pump in the distillation process.

In some cases, depending on the thermal condition of the feed, the heat wasted in the overhead condenser will be essentially equal to the heat input to the reboiler. If some means is available to use the condenser heat to heat the reboiler, the thermal efficiency could be greatly increased and the energy operation cost reduced. This is accomplished to some extent by prior art fractionation processes utilizing heat pumps.

This invention achieves this objective by operating the stripping and rectification section at dramatically different conditions to permit using the heat in the overhead from the rectification section to heat the reboiler at the bottom of the stripping section, and by using a heat pump compressor to raise the temperature and pressure of vapors passing from the stripping section to the rectifying section of a fractionator. Further, the use of a compressor between the stripping and rectifying sections, with resultant higher pressure in the rectifying section, enables a given separation to be accomplished more efficiently, with fewer stages or trays in the unit, or smaller vessel sizes, or both.

SUMMARY OF THE INVENTION

According to the present invention, operating conditions in the stripping and rectifying sections of a fractionating unit are maintained at levels that permit using the heat in the overhead vapors from the rectifying section to reboil the stripping section. The stripping section is operated at a low pressure and the rectifying section is operated at a higher pressure. The difference in pressure between the two sections provides a higher temperature on the rectifying section overhead vapors and a lower temperature on the stripping section bottoms liquid, so that the overhead vapors can be condensed in the reboiler while simultaneously providing reboil heat to the stripping section, thus reducing or eliminating the requirement for an external heat source to reboil the stripping section bottoms and for a cooling source to condense the rectifying section overhead vapors. If the condenser or reboiler loads are not exactly matched, an auxiliary condenser or reboiler may be utilized.

Vapor from the stripping section is compressed in a heat pump where its temperature and pressure are raised, and the heated and compressed vapors are then fed into the rectifying section which is maintained at a higher temperature and pressure than the stripping section. This enables the overhead vapors from the rectifying section to be at a high enough temperature to be condensed against the stripping section bottoms and to simultaneously provide reboil heat to the stripping section.

It is an object of this invention to provide a more energy-efficient fractionation process utilizing different conditions in the stripping and rectifying sections of the fractionating unit.

It is a further object to provide such a process utilizing a compressor for compressing and heating vapors from the stripping section into the rectifying section.

DESCRIPTION OF THE PREFERRED EMBODIMENT

Figure 1:
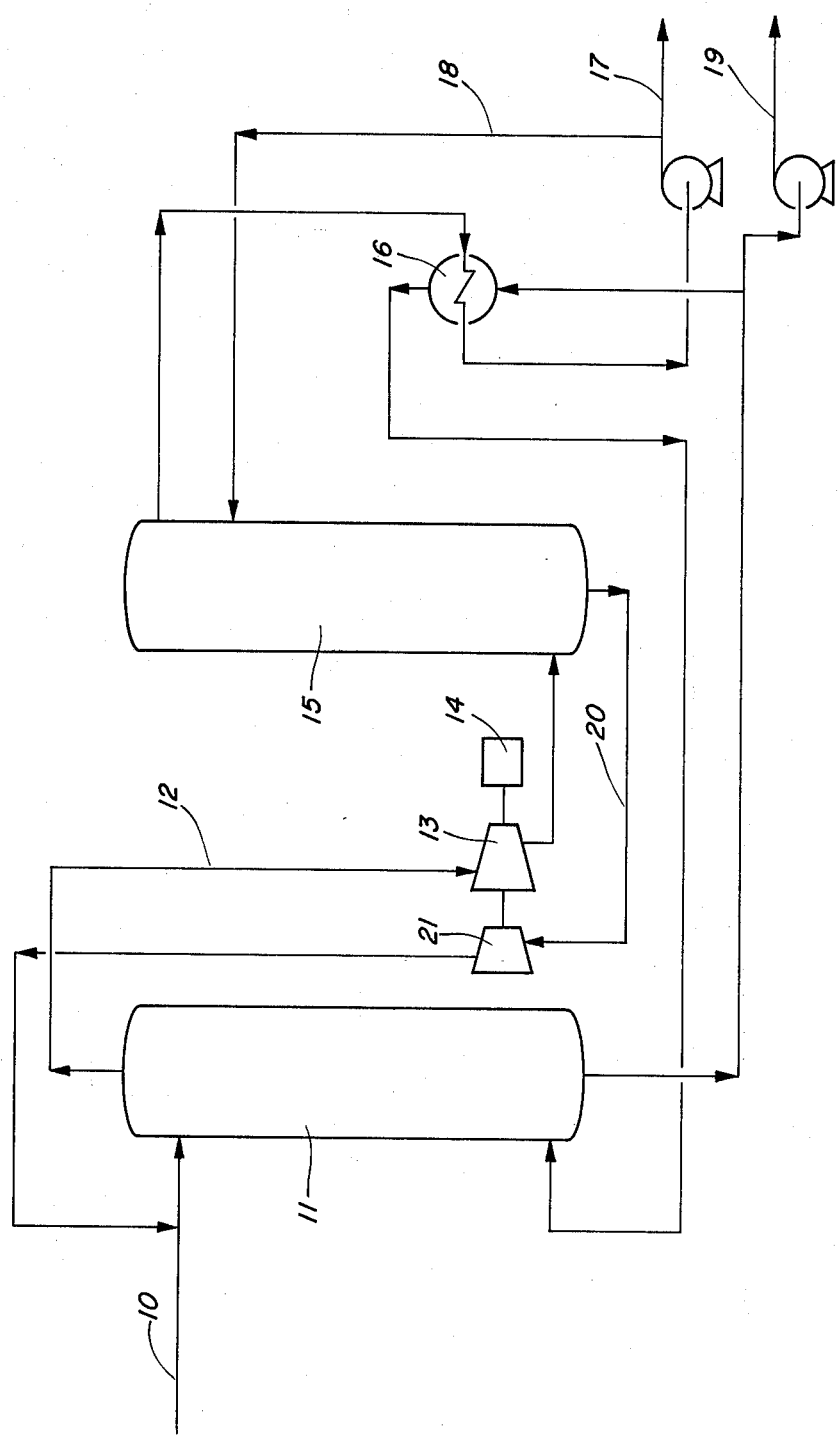

The preferred embodiment of the invention will be described generally with reference to the drawing.

It will be apparent that it would be applicable to many separations such as splitting of propanes and lighter components from butanes and heavier components, propane-propylene separation, butene-2-isobutene separation, normal butane-isobutane separation, and ethylene-ethane separation. Many other separations of compounds will be equally improved by the improved fractionation process of this invention.

As seen in the drawing, a feed line 10 leads to the top of stripping section 11. The feed is distilled in the stripping section 11 which is maintained at a first temperature and pressure. Overhead vapors leave the top of stripping section 11 through line 12 to the inlet of heat pump compressor 13 which is powered by motor 14 or other power source. The compressed vapor leaving heat pump compressor 13 at an elevated temperature and pressure is fed to the bottom of rectifying section 15 which is maintained at a pressure and temperature higher than the pressure and temperature in stripping section 11. Overhead vapors from the top of the rectifying section pass through heat exchanger 16 where they are condensed and recovered partially as product through line 17 and partially recycled through line 18 to the top of the rectifying section. Bottoms liquid from the stripping section is partly recovered as product through line 19 and partly heat exchanged with vapors from the rectifying section in heat exchanger 16 where it picks up reboil heat and is returned to the bottom of the stripping section. Thus, it will be seen that heat exchanger 16 operates as a condenser for the high temperature overhead vapors and as a reboiler for the lower temperature bottoms liquid. Liquid from the bottom of the rectifying section is returned through line 20 to the top of the stripping section. As shown in the drawing, the liquid from the rectifying section preferably passes through a turbine expander 21 or other power recovery means to provide part of the energy for driving heat pump compressor 13.

In some cases, the stripping section is reboiled internally, in which case the flow lines would vary from the arrangement shown in the drawing. However, the principles of operation and the advantages obtained would be similar regardless of the actual physical arrangement of the piping and other elements of the fractionating unit. Similarly, the feed in some cases might go into the rectifying section.

The foregoing general description of the improved heat pump fractionation process of this invention is very general in nature. Details of process instrumentation and control are not shown, as these will vary depending on the particular separation involved, the degree of product purity required, and other process variables which will vary with the specific use of the general process. A typical operation of the invention involving separation of butanes and lighter hydrocarbons is described in Example 1.

EXAMPLE 1

In this example, a feed stream having the composition set forth in the Material Balance appearing below is fed to stripping section 11 at 43° C. A vapor stream from stripping section 11 at a temperature of 21° C. and a pressure of 4 kg/cm$^2$ is removed through line 12 to heat pump compressor 13 where it is compressed to a pressure of 18 kg/cm$^2$ and a temperature of 81° C. The heated and compressed stream is fed to the bottom of rectifying section 15. A vapor stream from the top of the rectifying section at a temperature of 54° C. passes to heat exchanger 16 where it is condensed. The condensed liquid is partially returned to the top of the rectifying section as reflux and partially recovered as product having the composition set forth in the Material Balance. A liquid stream from the bottom of the rectifying section is returned to the top of the stripping section. Bottoms liquid from the stripping section at 43° C. is partially taken as butane product having the composition set forth in the Material Balance and partially passed through heat exchanger 16 to pick up reboil heat from the condensing vapor.

| MATERIAL BALANCE | | | |
|---|---|---|---|
| Mols/Hr | | | |
| | Feed | Overhead | Bottoms |
| Ethylene | 0.28 | 0.28 | — |
| Ethane | 1.76 | 1.76 | — |
| Propylene | 10.64 | 10.64 | — |
| Propane | 187.73 | 187.38 | 0.35 |
| Butylene | 11.71 | 0.05 | 11.66 |
| isobutane | 132.58 | 4.22 | 128.36 |
| n-butane | 28.78 | 0.02 | 28.76 |

The net energy requirement for the above-described operation utilizing the process of this invention is only about one-half of the energy requirement for obtaining the same separation in a conventional distillation column in which the stripping and rectifying sections are maintained at the same temperature and pressure and in which the overhead vapors are condensed with cooling water. Thus, it is apparent that significant energy savings can be obtained utilizing the process of this invention. These energy savings are in some cases at the expense of additional capital cost, but for many separations the process of the invention can provide substantial savings.

The essential feature of the invention is the operation of a rectifying section of a fractionator unit at a higher pressure than the stripping section, with the vapors from the stripping section being compressed and heated in a heat pump compressor before being passed to the rectifying section. Preferably, at least a part of the overhead vapors from the rectifying section are condensed in a combination condenser and reboiler heat exchanger to provide reboil heat to the stripping section and to eliminate the requirement for condensing the rectifier vapors against cooling waters or air and to eliminate the need for a separate reboiler heater. Numerous variations and modifications in the basic process as described above will be apparent to those skilled in the art. The foregoing description of the preferred embodiment is intended to be illustrative rather than limiting, and the invention is to be defined by the appended claims.

I claim:

1. In a process for separating compounds by fractionation in a fractionator comprised of a stripping section below the feed point and a rectifying section above the feed point, the improvement wherein only a vapor stream from the stripping section at a first temperature and pressure is passed through a single heat pump compressor directly to the rectifying section whereby the vapor stream leaving the heat pump compressor is at a higher temperature and pressure and the rectifying section is maintained at a higher temperature and pressure than the stripping section and bottoms liquid from the stripping section and overhead vapor from the rectifying section are heat exchanged to provide reboiler heat to the stripping section and to condense vapor from the rectifying section.

2. A process for separating chemical compounds having different boiling points in a fractionating unit including a stripping section below the feed point and a rectifying section above the feed point which comprises the steps of:

(a) passing a feed stream comprising a first and a second chemical compound into the fractionating unit;

(b) maintaining the stripping section at a first temperature and pressure;

(c) withdrawing a vapor stream from the stripping section;

(d) compressing only said vapor stream to increase its temperature in a single heat pump compressor and pressure;

(e) passing the compressed stream directly to the rectifying section;

(f) maintaining the rectifying section at a higher pressure and temperature than the stripping section;

(g) withdrawing a product vapor stream rich in said second compound from the rectifying section;

(h) withdrawing a liquid stream rich in said first compound from the stripping section; and (i) utilizing heat in said product vapor stream from the rectifying section to reboil the stripping section.

3. The process of claim 2 wherein the feedstream is predominantly comprised of propane and butane.

4. A process for separating chemical compounds having different boiling points in a fractionating unit including a stripping section below the feed point and a rectifying section above the feed point which comprises the steps of:

(a) passing a feed stream comprising a first and a second chemical compound into the fractionating unit;

(b) maintaining the stripping section at a first temperature and pressure;

(c) withdrawing an overhead vapor stream from the stripping section;

(d) compressing only said overhead vapor stream to increase its pressure and temperature in a single heat pump compressor;

(e) passing the compressed stream directly to the rectifying section;

(f) maintaining the rectifying section at a higher temperature and pressure than the stripping section;

(g) withdrawing a liquid stream from the bottom of the rectifying section and returning it to the stripping section;

(h) withdrawing an overhead vapor stream rich in said second compound from the rectifying section;

(i) withdrawing a liquid stream rich in said first compound from the bottom of the stripping section;

(j) passing a portion of the liquid stream from the bottom of the stripping section in heat exchange relationship with at least a portion of the overhead vapor stream from the rectifying section whereby the liquid is heated and at least part of the vapor is condensed;

(k) returning the heated liquid stream to the bottom of the stripping section to provide reboiler heat;

(l) recovering the remainder of the liquid stream from the bottom of the stripping section as product;

(m) returning a portion of the condensed vapor from step (j) to the top of the rectifying section as reflux; and (n) recovering the remainder of the condensed vapor from step (j) as product.

* * * * *